Aug. 4, 1925.

G. KIERNAN 1,548,045

RESILIENT VEHICLE TIRE

Filed Dec. 8, 1923

George KIERNAN
INVENTOR;

By
his Attorney.

Patented Aug. 4, 1925.

1,548,045

UNITED STATES PATENT OFFICE.

GEORGE KIERNAN, OF AUCKLAND, NEW ZEALAND, ASSIGNOR OF ONE-THIRD TO WILLIAM ALLEN BROWNE AND ONE-THIRD TO CHARLES WILLIAM POPP, BOTH OF AUCKLAND, NEW ZEALAND.

RESILIENT VEHICLE TIRE.

Application filed December 8, 1923. Serial No. 679,477.

*To all whom it may concern:*

Be it known that GEORGE KIERNAN, a citizen of the British Empire, residing at No. 3 Hill Street, Newmarket, in the city of Auckland, in the Dominion of New Zealand, has invented a certain new and useful Improved Resilient Vehicle Tire, of which the following is a specification.

My invention relates to resilient tires for vehicles in which instead of a pneumatic tube there is used a rubber body or core having housings for inflated air balls which are inserted in the housing through a slit opening on the inner surface of the core said slit being adapted to be forced open for the insertion above referred to.

The defects in known tires above described are that owing to the air balls in them being placed on a circle in the core there are a constant series of shocks to the tire when in use which prevent complete smoothness of running and injure the tire by reason of the variation in strains on it caused by the solid portions of the core alternating with the inflated balls. My invention removes these defects, and is carried out by using a split core or body preferably of rubber having in it a series of housings placed in staggered arrangement and arranged and adapted to receive and hold inflated air cushions whereby the whole of the tire tread has inflated air behind it and moreover whereby each inflated air cushion nearest the tread is supported or reinforced by two inflated air cushions behind it resulting in almost perfect smoothness of running, no bouncing, and prolongation of the life of the tire tread.

Figure 1:
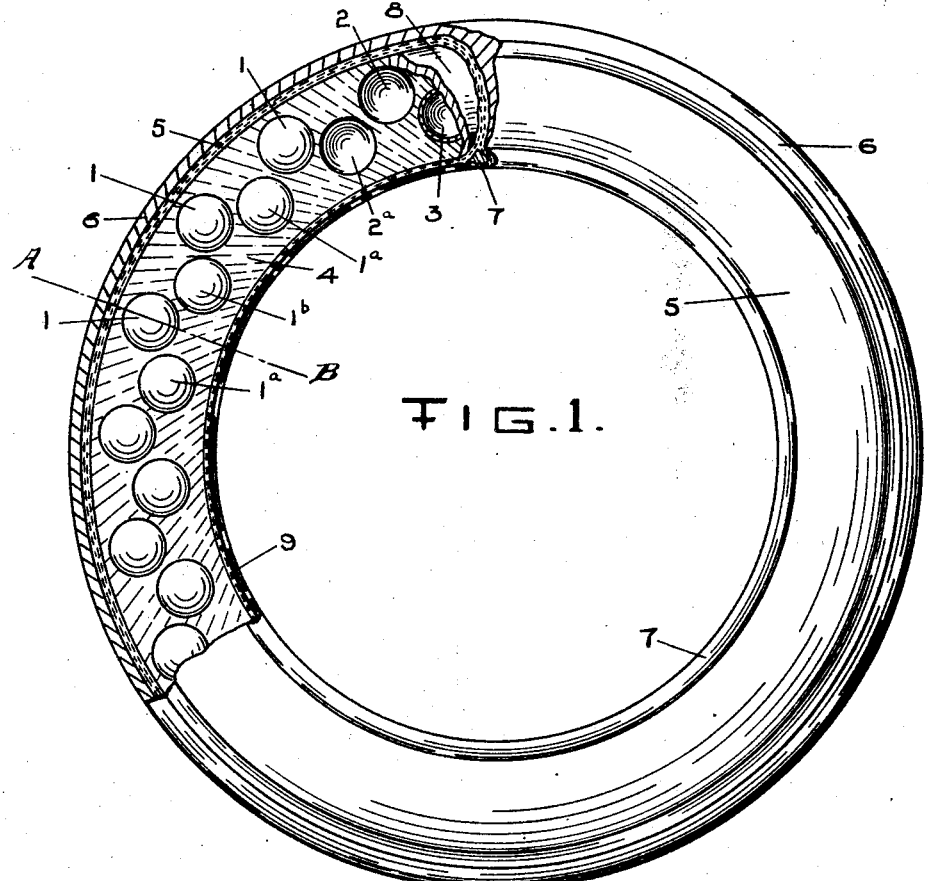
Figure 2:
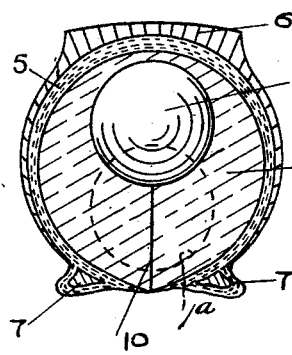
Figure 3:
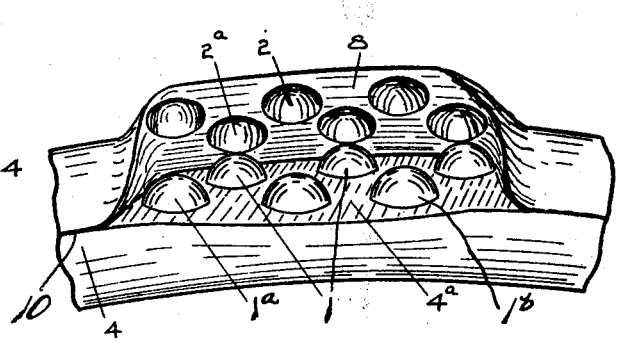

My invention consists in these features and the combinations and arrangements of parts hereinafter described and particularly stated by the claim. My invention is illustrated in the accompanying drawings showing one embodiment thereof with inflated balls as cushions. Figure 1 is a view showing in elevation and part section my invention in position in a motor car tire, Figure 2 is a cross section through line A—B on Figure 1 showing the tire, core, and inflated cushions, Figure 3 is a perspective view of part of the core according to my invention forced open at the slit therein and the inflated cushions in position. In these drawings within the outer cover 5 of the tire, within which a pneumatic tube is usually placed and round which the tread 6 is secured in the usual way, I insert a solid rubber core 4 which has a slit 10 in it whereby the core may be opened up as shown in Figure 3. This rubber core 4 has formed in it a series of cavities 2, $2^a$ one half of each cavity being in each of the split halves $4^a$, 8 of the core 4 and such cavities are arranged in staggered relationship throughout the core to take inflated air cushions 1, $1^a$, a cross section of an inflated cushion in a cavity being shown at 3 of Figure 1. This staggered arrangement is such that each inflated air cushion 1 nearest the tread 6 has two inflated air cushions $1^a$, $1^b$ behind it and supporting it.

The inflated cushions 1 are inserted in the cavities 2 by opening the core at the slit 10 and holding the edges apart and then thrusting in the cushions and should one or more of the inflated cushions be punctured it is thus easily replaced.

I claim:

A resilient vehicle tire comprising a tire casing, a core filling the interior of said casing and having staggered cavities therein, the centers of which lie in a plane parallel to the plane of the tire, and inflated air cushions filling said cavities.

In testimony whereof I have affixed my signature in presence of two witnesses.

GEORGE KIERNAN.

Witnesses:
ANDREW JOHN PARK,
INEZ LILIAN FLEMING.